US010862401B2

(12) United States Patent
Jimenez Pino et al.

(10) Patent No.: US 10,862,401 B2
(45) Date of Patent: Dec. 8, 2020

(54) TANDEM DC/DC CONVERTER FOR A VEHICLE BATTERY CHARGER

(71) Applicant: Lear Corporation, Southfield, MI (US)

(72) Inventors: Rafael Jimenez Pino, Valls (ES); Jordi Escoda Valldeperez, Valls (ES); Oscar Lucia Gil, Saragossa (ES); Hector Sarnago Andia, Soria (ES); Alejandro Naval Pallares, Huesca (ES)

(73) Assignee: LEAR CORPORATION, Southfield, MI (US)

( * ) Notice: Subject to any disclaimer, the term of this patent is extended or adjusted under 35 U.S.C. 154(b) by 71 days.

(21) Appl. No.: 16/171,929

(22) Filed: Oct. 26, 2018

(65) Prior Publication Data

US 2020/0136520 A1    Apr. 30, 2020

(51) Int. Cl.
*H02J 7/00* (2006.01)
*H02M 3/335* (2006.01)
*B60L 53/20* (2019.01)
*B60L 53/30* (2019.01)
*H02M 1/42* (2007.01)

(52) U.S. Cl.
CPC ......... *H02M 3/33584* (2013.01); *B60L 53/20* (2019.02); *B60L 53/30* (2019.02); *H02J 7/00* (2013.01); *B60L 2210/10* (2013.01); *H02J 2207/20* (2020.01); *H02M 1/4208* (2013.01)

(58) Field of Classification Search
CPC .............................. H02M 3/33584; H02J 7/00
USPC ........................................................ 320/109
See application file for complete search history.

(56) References Cited

U.S. PATENT DOCUMENTS

| 9,692,313 | B1 * | 6/2017 | Isurin | H02M 7/06 |
| 2009/0034299 | A1 * | 2/2009 | Lev | H02M 3/337 363/17 |
| 2015/0326066 | A1 * | 11/2015 | Yamada | H02M 7/5387 318/440 |
| 2016/0322827 | A1 | 11/2016 | Gupta et al. | |
| 2017/0025965 | A1 * | 1/2017 | Ramabhadran | H02M 3/33546 |
| 2018/0141457 | A1 * | 5/2018 | Lee | H02M 3/33546 |
| 2019/0229625 | A1 * | 7/2019 | Jimichi | H02M 3/33584 |
| 2019/0238059 | A1 * | 8/2019 | Dai | H02M 3/33576 |
| 2019/0326813 | A1 * | 10/2019 | Li | H02M 1/4258 |

FOREIGN PATENT DOCUMENTS

| DE | 102013005277 B3 | 7/2014 |
| FR | 3026243 A1 | 3/2016 |
| WO | 2010070789 A1 | 6/2010 |

* cited by examiner

*Primary Examiner* — Suchin Parihar
(74) *Attorney, Agent, or Firm* — Brooks Kushman P.C.

(57) ABSTRACT

In at least one embodiment, a charging apparatus for a vehicle is provided. The apparatus includes a power converter having a primary stage, a first secondary stage, and a second secondary stage. The primary stage is configured to receive an incoming voltage to generate a first input voltage. The first secondary stage includes a first plurality of electrical components configured to generate a first portion of an output voltage. The second secondary stage is in series with the first secondary stage and includes a second plurality of electrical components configured to generate a second portion of the output voltage. Each of the first plurality of electrical components and the second plurality of electrical components is rated to a voltage rating that is less than a total sum of the first portion and the second portion of the output voltage.

20 Claims, 3 Drawing Sheets

TANDEM DC/DC CONVERTER FOR A VEHICLE BATTERY CHARGER

TECHNICAL FIELD

Aspects disclosed herein generally relate to a tandem direct current to direct current converter (or DC/DC converter) for a vehicle battery charger. These aspects and others will be discussed in more detail herein.

BACKGROUND

FR3026243 to Sakr et al. discloses a combined device for charging a battery and supplying an electric machine that includes two parallel stages intended to be connected between the battery and a supply network with each comprising a DC/DC converter. Each DC/DC converter is arranged for connection on a battery side. In a battery charging mode, an inverter circuit of one of the parallel stages constitutes a bridge of diodes ensuring the rectification of the current supplied by the network. The inverter circuit of the other stage is connected to least one inductor to constitute an active harmonic compensation filter generated by the diode bridge.

SUMMARY

In at least one embodiment, a charging apparatus for a vehicle is provided. The apparatus includes a power converter having a primary stage, a first secondary stage, and a second secondary stage. The primary stage is configured to receive an incoming voltage to generate a first input voltage. The first secondary stage includes a first plurality of electrical components configured to generate a first portion of an output voltage for charging at least one battery in a vehicle in response to the first input voltage. The second secondary stage is in series with the first secondary stage and includes a second plurality of electrical components configured to generate a second portion of the output voltage in response to the first input voltage. Each of the first plurality of electrical components and the second plurality of electrical components is rated to a voltage rating that is less than a total sum of the first portion and the second portion of the output voltage.

In at least another embodiment, a charging apparatus for a vehicle is provided. The apparatus includes a DC/DC converter having a primary stage, a first secondary stage, and a second secondary stage. The primary stage is configured to receive an incoming voltage to generate a first input voltage. The first secondary stage includes a first plurality of electrical components configured to generate a first portion of an output voltage for charging at least one battery in a vehicle in response to the first input voltage. The second secondary stage includes a second plurality of electrical components configured to generate a second portion of the output voltage in response to the first input voltage. Each of the first plurality of electrical components and the second plurality of electrical components is rated to a voltage rating that is less than a total sum of the first portion and the second portion of the output voltage.

In at least another embodiment, a charging apparatus for a vehicle is provided. The apparatus includes a power converter having a primary stage, a first secondary stage, a transformer, and a second secondary stage. The primary stage is configured to receive an incoming voltage to generate a first input voltage. The first secondary stage includes a first plurality of electrical components configured to generate a first portion of an output voltage for charging at least one battery in a vehicle in response to the first input voltage. The second secondary stage is in series with the first secondary stage and includes a second plurality of electrical components configured to generate a second portion of the output voltage in response to the first input voltage. The transformer is operatively coupled to the primary stage, the first secondary stage, and the second secondary stage to transfer the first input voltage to the first secondary stage and the second secondary stage. Each of the first plurality of electrical components and the second plurality of electrical components is rated to a voltage rating that is less than a total sum of the first portion and the second portion of the output voltage.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include: any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a computer-program that is embodied in a non-transitory computer readable medium programmed to perform any number of the functions as disclosed.

Figure 1:
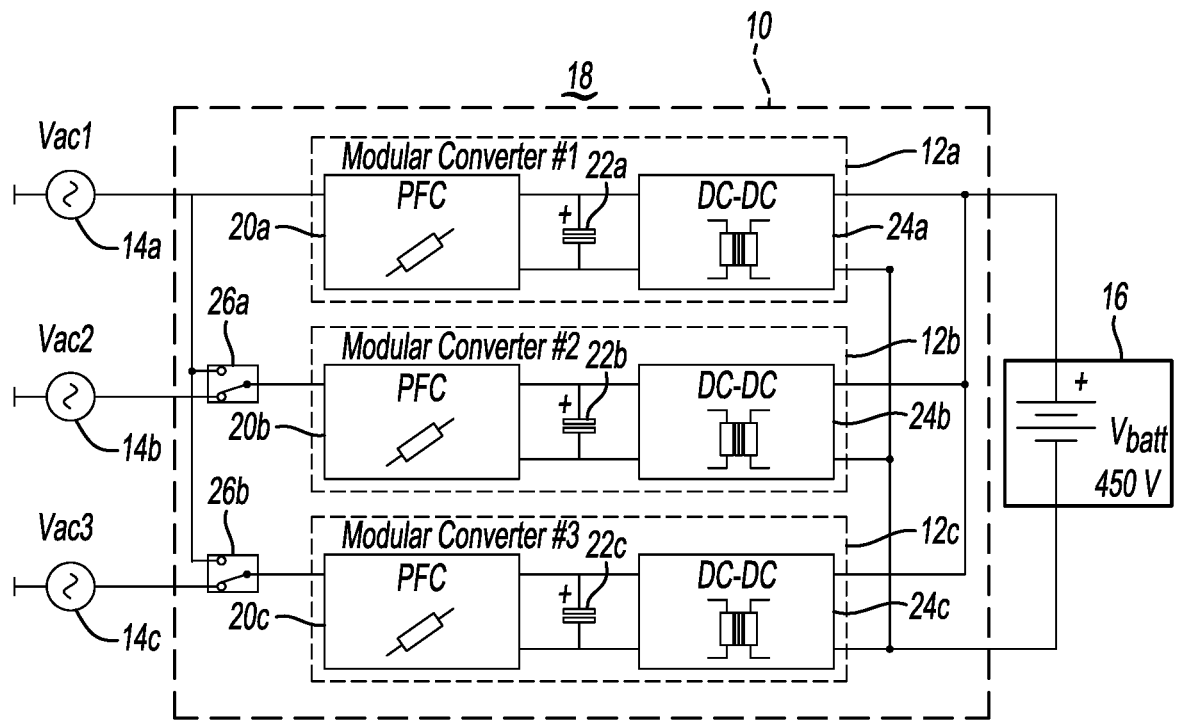
FIG. 1 depicts a three-phase vehicle battery charger topology for a 450V-high voltage (HV) battery.

FIG. 1 depicts a three-phase battery charger topology (or battery charger) 10. The battery charger 10 includes a plurality of modular converters 12a-12c. A plurality of alternating current (AC) power supplies 14a-14c, each provide an AC based signal to the plurality of modular converters 12a-12c, respectively of the battery charger 10. It is recognized that the AC power supplies 14a-14c may be any suitable power supply that is located in a residential, commercial, or other charging station that is arranged to provide an AC voltage for charging one or more batteries 16 (hereafter battery 16) of a hybrid electric vehicle (HEV), electric vehicle (EV) or any other vehicle 18 that is configured to receive an AC signal for battery charging (hereafter vehicle 18). The AC power suppliers 14a-14c interface with the modular converters 12a-12c (or DC/DC converters 12) to provide a DC based voltage output for storage on the battery 16. For example, the modular converters 12a-12c are configured to generate a voltage output at approximately 470V maximum for storage on the battery 16 in response to the AC voltage from the AC power supplies 14a-14c.

The modular converters 12a-12c generally include power correction factor (PFC) circuits 20a-20c, respectively, coupling capacitors 22a-22c, respectively, and DC/DC converters 24a-24c, respectively. The PFC circuits 20a-20c may each be configured to perform power factor correction on the AC voltage from each AC power supply 14a-14c, respectively, to raise a power factor of the AC voltage closer to one. It is recognized that each modular converter 12a-12c may also include a rectifier such as a transformer for converting the AC voltage into a DC-based output to provide to a corresponding DC/DC converter 24a-24c. In general, the battery 16 may be sized up to 470V and the three-phase battery charger topology may provide an output charging power of 7, 11, or 22 kW. The battery charger 10 utilizes the modular converters 12a-12c (or charging phases) to share the total power and minimize component size. The battery charger 10 provides a three-phase solution which may be suitable to cope with a three-phase AC input. Each modular converter 12a-12c provides a third of the total power (i.e., the same voltage and a third of the current) of a balanced three-phase system that is utilized. First and second switches 26a-26b (or control stages) are operably coupled to any number of controllers (not shown) for controlling the manner in which the modular converters 12a-12c are connected to one another and to the type of grid connected at an AC input (e.g., single phase or three-phase) and the output charging power (e.g., 7 kW) that connects to the first switch 26a (i.e., parallel to modular converter 12a and modular converter 12b). The first and second switches 26a-26b, under control of the controller, work in parallel so that the modular converters 12a-12c behave similarly (e.g., the control stage adapts battery voltage and current acceptance). Outputs of the PFC circuits 20a-20c are coupled to respective DC/DC converters 24a-24c.

Regarding the AC to DC conversion, a rectifier (not shown) operates along with PFC stages (or the PFC circuits 20a-20c). In the rectifier stage, a series of internal switches (e.g., diodes) control the AC-energy flow and ensures that at AC negative cycles, the energy flow is still kept towards the PFC circuits 20a-20c. A primary function of the PFC circuits 20a-20c is to maximize the real power transfer from AC power supplies 14a-14c to DC/DC converters 24a-24c (e.g., by acting as a pure resistor), thus reactive energy must be near zero, even the real load (e.g., the DC-Link coupling capacitors 22a-22c and DC/DC converters 24a-24c are reactive components). In doing so, there are many PFC topologies available and multiple implementations, however, a control system is in place to maintain control of the PFC circuits 20a-20cwhich comprises sensing input current and voltage with the target of having both waveforms with same sine wave and in phase and maintaining an effective constant voltage at the capacitors 22a-22c. This control loop is generating a PWM consign (frequency and/or duty cycle) that is used as modulation for the PFC circuits 20a-20c.

Figure 2:
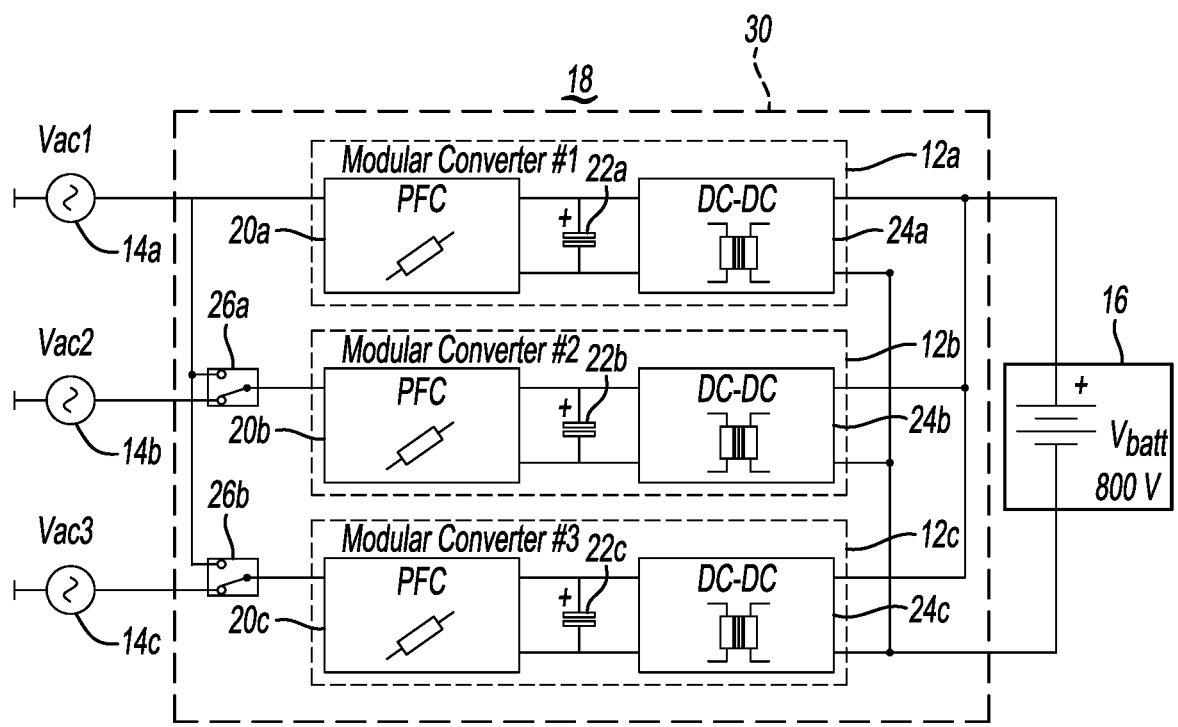
FIG. 2 depicts another three-phase vehicle battery charger topology for an 800-HV battery.

FIG. 2 depicts another three-phase vehicle battery charger topology 30. In general, the battery charger 30 operates similarly to the battery charger 10 of FIG. 1. However, the battery charger 30 is arranged to provide more power density and a quicker charge time. Thus, various Original Equipment Manufacturers (OEMs) may elevate the voltage output for storage on the battery 16 to 800V as opposed to 470V as disclosed in connection with FIG. 1. To adapt the battery charger 30 to provide 800V using the same topology of the battery charger 10 as illustrated in FIG. 1, various second DC/DC stage components may need to withstand 1200V. It is recognized that the DC/DC converters 24a-24c for each of the battery charger 10 (see FIG. 1) and the battery charger 30 (see FIG. 2 includes a primary stage and a secondary stage). As noted above, each of the modular converters 12a-12c are in parallel with one another. Thus, each of the modular converters 12a-12c share (or provide) the same output voltage but generate 1/n (where n corresponds to the number of modular converters 12a-12c) of the total amount of current.

Given the higher voltage range of 800V and the need to provide DC/DC stage components that can withstand 1200V, such higher rated components may be more expensive than the components used in connection with the battery charger 10 of FIG. 1. For example, Si-based switches (or transistors) suitable for 400V batteries may be changed to SiC (Silicon Carbide) 1200V switches. In addition, various aspects such as capacitor technology, printed circuit board (PCB) distances on the DC/DC converter 24, etc. may now need to be rescaled to higher voltages to provide 800V to the battery 16.

Figure 3:
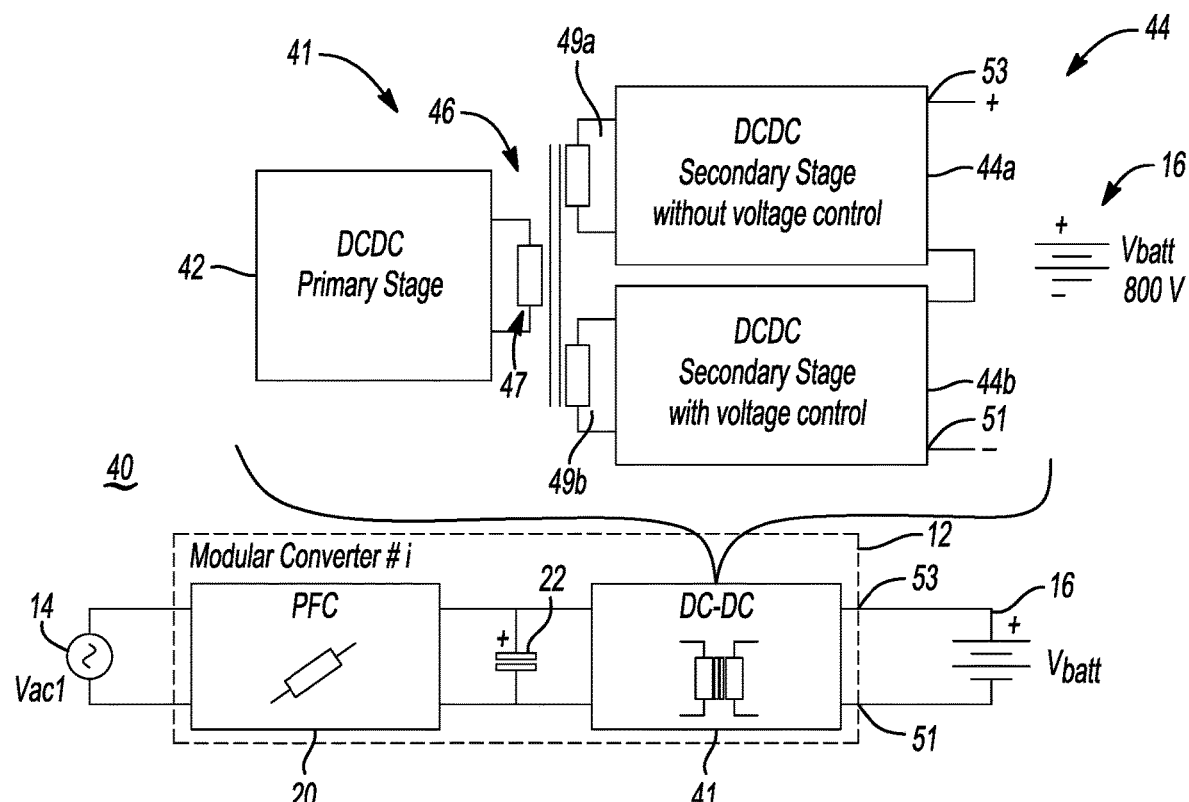
FIG. 3 depicts a three-phase vehicle battery charger topology in accordance to one embodiment.

FIG. 3 depicts a three-phase vehicle battery charger topology (or battery charger) 40 in accordance to one embodiment. The battery charger topology 40 includes the AC power supply 14, the PFC circuit 20, and a DC/DC converter 41 (i.e., the modular converter 12). The DC/DC converter 41 is arranged to provide 800V to the battery 16 to meet OEM requirements. The DC/DC converter 41 generally includes a DC/DC primary stage 42, a first DC/DC secondary stage 44a (or DC/DC secondary stage without voltage control), a second DC/DC secondary stage 44b (or DC/DC secondary stage with voltage control), and a transformer 46. The first DC/DC secondary stage 44a and the second DC/DC secondary stage 44b may be collectively referred to as a DC/DC secondary stage 44.

The first DC/DC secondary stage 44a and the second DC/DC secondary stage 44b are in series with one another. With this configuration (i.e., the series arrangement between the first DC/DC secondary stage 44a and the second DC/DC secondary stage 44b), the DC/DC converter 41 utilizes components that can withstand 650V as opposed to 1200V which would otherwise be required (or that the DC/DC converter 41 utilizes components that are rated to, or have a voltage rating of, for example, only 650V as opposed to 1200V since the corresponding outputs do not exceed more than 500V which will be explained in more detail below).

The first DC/DC secondary stage 44a may fix an intermediate voltage (e.g., a voltage that is approximately half of the high voltage range of the battery) (i.e., 400V for an 800V battery). The second DC/DC secondary stage 44b may be used for adjusting voltage (or provides a variable voltage) (e.g., from 30V to 400V for an 800V battery) from the first DC/DC secondary stage 44a. Thus, the two series-stages (e.g., the first and second DC/DC secondary stages 44a and 44b) each provide roughly half of the output voltage and share the total current (e.g., 1/n, where n corresponds to the number of modular converters 12 used in a battery charger system). In one example, it can be seen that the first DC/DC secondary stage 44a operates at a fixed output voltage (without voltage control) to elevate the incoming voltage from the second DC/DC secondary stage 44b.

The DC/DC primary stage 42 inverts a DC voltage that is stored on the capacitor 22 to energize primary windings 47 of the transformer 46. Secondary windings 49a and 49b of the transformer 46 are provided for the purpose of connecting to the first DC/DC secondary stage 44a and to the second DC/DC secondary stage 44b, respectively. A ground reference 51 of the second DC/DC secondary stage 44b is coupled to a ground of the battery 16. A voltage positive 53 of the first DC/DC secondary stage 44a is connected to a high side of the battery 16. Outputs 55 and 57 of the first DC/DC secondary stage 44a and the second DC/DC secondary stage 44b, are tied together (e.g., either internally or externally) such that a total output voltage therefrom is a sum of the output voltage generated by both the first DC/DC secondary stage 44a, and the second DC/DC secondary stage 44b.

Figure 4:
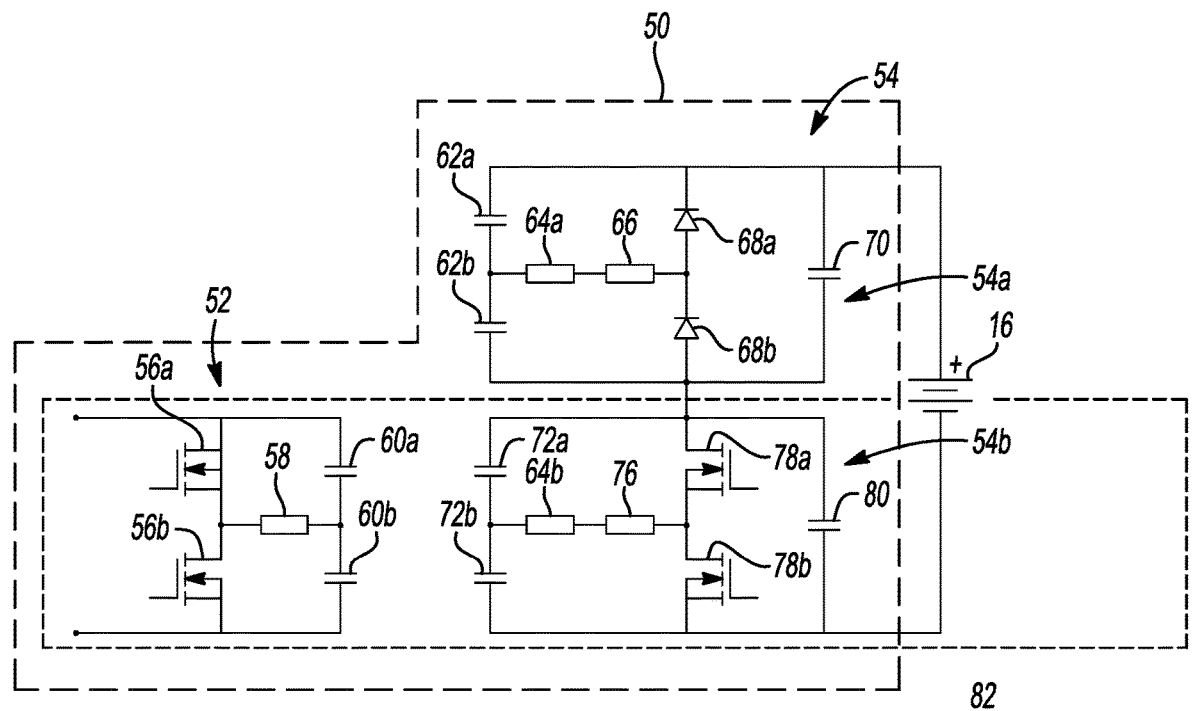
FIG. 4 depicts a first DC/DC converter in accordance to one embodiment.

FIG. 4 depicts a first DC/DC converter 50 in accordance to one embodiment. In one example, the first DC/DC converter 50 may be implemented as a Dual-Active-Bridge (DAB) structure in addition to a Hybrid SRC. The first DC/DC converter 50 includes a primary stage 52 and a secondary stage 54. Each of the components utilized in the primary stage 52 and the secondary stage 54 are rated to, or has a voltage rating of, for example, only 650V (e.g., voltage rating) as opposed to 1200V since the corresponding outputs do not exceed more than 500V (e.g., generally 400V). Similar to the DC/DC converter 41 noted above in connection with FIG. 3, the first DC/DC converter 50 is configured to provide 800V to the battery 16 to meet OEM requirements. The secondary stage 54 generally includes a first DC/DC secondary stage 54a and a second DC/DC secondary stage 54b.

The primary stage 52 generally includes a first plurality of switches 56a-56b, a primary side of a transformer 58, and a plurality of capacitors 60a-60b. The first DC/DC secondary stage 54a includes a plurality of capacitors 62a-62b, a secondary side of a transformer 64a, an inductor 66, a plurality of diodes 68 (or 68a and 68b), and a capacitor 70. The second DC/DC secondary stage 54b includes the secondary side of the transformer 64b, a plurality of capacitors 72a-72b, an inductor 76, a second plurality of switches 78a and 78b, and a capacitor 80. The plurality of switches 56a-56b provide commutations that excite the primary side of the transformer 58 to invert DC energy from the capacitor 22 to transfer an AC based voltage to the first DC/DC secondary stage 54a and the second DC/DC secondary stage 54b. The first DC/DC secondary stage 54a and the second DC/DC secondary stage 54b each process the transferred energy (or the AC based voltage) from the primary stage 52. For example, the first DC/DC secondary stage 54a rectifies a voltage waveform produced from the secondary side of the transformer 64a (or secondary winding of the transformer 64), which produces a DC based charge (or DC based voltage) that is stored on the capacitor 70 at a fixed voltage level. For example, the plurality of diodes 68 rectify the voltage waveform thereby enabling energy transfer when each diode 68 is in direct bias. Thus, the diodes 68 alternately enable one semi-period of the removed AC in the primary side of the transformer 58 to flow to the output. The result is a positive output that will be filtered by the capacitor 70. The second DC/DC secondary stage 54b rectifies the voltage waveform from the secondary side of the transformer 64b by way of commutations of the second plurality of switches 78a-78b. This generates a DC based charge (or DC based voltage) that is stored across the capacitor 80 at a variable voltage that is managed by a switching sequence applied to the second plurality of switches via a controller 82.

The first DC/DC secondary stage 54a may fix or provide an intermediate voltage (e.g., a voltage that is approximately half of the high voltage range of the battery (i.e., 400V for an 800V battery)). Generally, the intermediate voltage is based on original equipment manufacturer (OEM) requirements and high-DC-voltage battery requirements which may be, for example, 350 to 400V. The second DC/DC secondary stage 54b may be used for adjusting a voltage to provide a variable voltage from, for example, 30V to 400V for an 800V battery. Thus, the two series-stages (e.g., the first and second DC/DC secondary stages 54a and 54b) each provide roughly half of the output voltage and share the total current (e.g., 1/n, where n corresponds to the number of modular converters 12 used in a battery charger system). In one example, it can be seen that the first DC/DC secondary stage 54a operates at a fixed output voltage (without voltage control) to elevate the incoming voltage from the second DC/DC secondary stage 54b.

Figure 5:
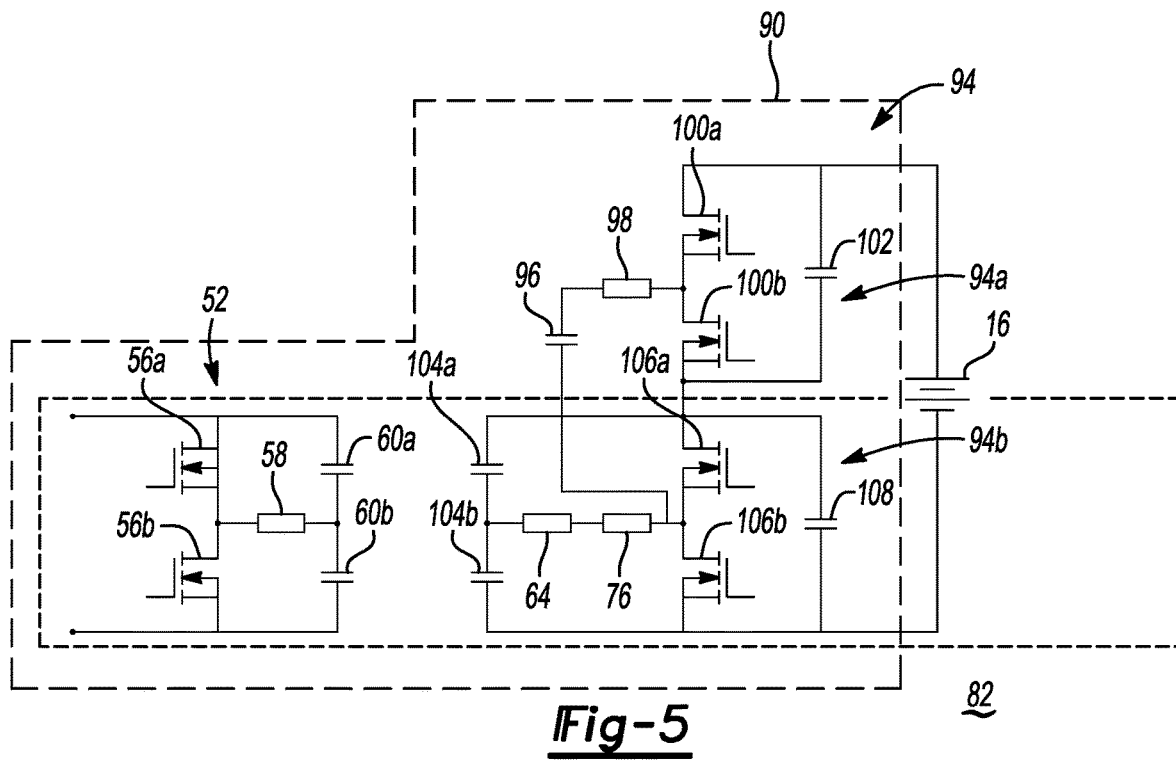
FIG. 5 depicts a second DC/DC converter in accordance to one embodiment.

FIG. 5 depicts a second DC/DC converter 90 in accordance to one embodiment. In one example, the second DC/DC converter 90 may be implemented as a DAB structure in addition to a series resonant converter (SRC) with bi-directionality functionality. The second DC/DC converter 90 includes the primary stage 52 and a secondary stage 94. Similar to the DC/DC converter 41 noted above in connection with FIG. 3, the second DC/DC converter 90 is configured to provide 800V to the battery 16 to meet OEM requirements. Each of the components utilized in the primary stage 52 and the secondary stage 94 are rated to, or has a voltage rating of, for example, only 650V as opposed to 1200V since the corresponding outputs do not exceed more than 500V.

The secondary stage 94 generally includes a first DC/DC secondary stage 94a and a second DC/DC secondary stage 94b. The first DC/DC secondary stage 94a includes a capacitor 96, an inductor 98, a plurality of switches 100a-100b, and a capacitor 102. The controller 82 may control the output voltage of the first DC/DC secondary stage 94a and the second DC/DC secondary stage 94b. The second DC/DC converter 90 includes bi-directional devices (e.g., switches 100a-100b and 106a-106b) both in the first DC/DC secondary stage 94a and in the second DC/DC secondary stage 94b.

Figure 6:
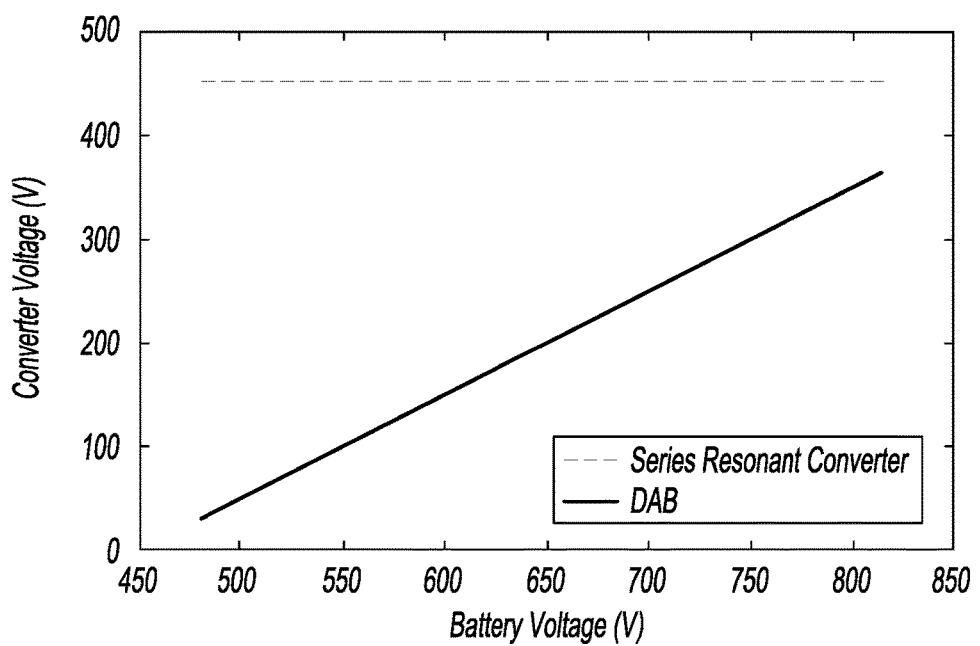
FIG. 6 corresponds to a plot depicting an output for a Dual-Active-Bridge (DAB) DC/DC converter-based structure and an output for a Series Resonant Converter (SRC)-DC/DC converter-based structure.

FIG. 6 corresponds to a plot depicting an output for the first DC/DC converter 50 that utilizes the DAB as illustrated in connection with, for example FIG. 5 and an output of the SRC as illustrated in connection with, for example, FIG. 4.

The output for the SRC based converter is fixed at 450V, while the DAB DC/DC based converter is regulated from 20V up to 380V as illustrated on the y-axis. The sum of the voltages as a result of a series connection of the SRC and DAB DC/DC converter is represented on the x-axis matching with a consigned HV battery voltage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charging apparatus for a vehicle, the apparatus comprising:
   a power converter including:
      a primary stage configured to receive an incoming voltage to generate a first input voltage;
      a first secondary stage including a first plurality of electrical components configured to generate a first portion of an output voltage to charge the at least one battery in a vehicle in response to the first input voltage; and
      a second secondary stage in series with the first secondary stage including a second plurality of electrical components configured to generate a second portion of the output voltage to charge the at least one battery in response to the first input voltage,
   wherein each of the first plurality of electrical components and the second plurality of electrical components is rated to a voltage rating that is less than a total sum of the first portion and the second portion of the output voltage.

2. The apparatus of claim 1, wherein the power converter is a DC/DC converter.

3. The apparatus of claim 1, wherein the first portion of the output voltage is generally equal to the second portion of the output voltage.

4. The apparatus of claim 1, wherein the total sum of the first portion and the second portion of the output voltage is 800V.

5. The apparatus of claim 1, wherein primary stage includes a first plurality of switches and a primary side of a transformer to generate the first input voltage that corresponds to an alternating current (AC) voltage.

6. The apparatus of claim 5, wherein the first plurality of electrical components of the first secondary stage includes a plurality of capacitors, an inductor, a plurality of diodes, and a first secondary side of a transformer to rectify the AC voltage to generate the first portion of the output voltage that is a first DC voltage.

7. The apparatus of claim 5, wherein the first plurality of electrical components of the first secondary stage includes a second plurality of switches and a first secondary side of the transformer to rectify the AC voltage to generate the first portion of the output voltage that is a first DC voltage.

8. The apparatus of claim 7, wherein the second plurality of electrical components of the second secondary stage includes a third plurality of switches a second secondary side of the transformer to rectify the AC voltage to generate the second portion of the output voltage that is a second DC voltage.

9. The apparatus of claim 8, wherein the first DC voltage is equal to the second DC voltage.

10. A charging apparatus for a vehicle, the apparatus comprising:
    a DC/DC converter including:
       a primary stage configured to receive an incoming voltage to generate a first input voltage;
       a first secondary stage including a first plurality of electrical components configured to generate a first portion of an output voltage to charge at least one battery in a vehicle in response to the first input voltage; and
       a second secondary stage including a second plurality of electrical components configured to generate a second portion of the output voltage to charge at least one battery in response to the first input voltage,
    wherein each of the first plurality of electrical components and the second plurality of electrical components is rated to a voltage rating that is less than a total sum of the first portion and the second portion of the output voltage.

11. The apparatus of claim 10, wherein the first secondary stage is in series with the second secondary stage.

12. The apparatus of claim 10, wherein the first portion of the output voltage is generally equal to the second portion of the output voltage.

13. The apparatus of claim 10, wherein the total sum of the first portion and the second portion of the output voltage is 800V.

14. The apparatus of claim 10, wherein primary stage includes a first plurality of switches and a primary side of a transformer to generate the first input voltage that corresponds to an alternating current (AC) voltage.

15. The apparatus of claim 14, wherein the first plurality of electrical components of the first secondary stage includes a plurality of capacitors, an inductor, a plurality of diodes, and a first secondary side of a transformer to rectify the AC voltage to generate the first portion of the output voltage that is a first DC voltage.

16. The apparatus of claim 14, wherein the first plurality of electrical components of the first secondary stage includes a second plurality of switches and a first secondary side of the transformer to rectify the AC voltage to generate the first portion of the output voltage that is a first DC voltage.

17. The apparatus of claim 16, wherein the second plurality of electrical components of the second secondary stage includes a third plurality of switches a second secondary side of the transformer to rectify the AC voltage to generate the second portion of the output voltage that is a second DC voltage.

18. The apparatus of claim 17, wherein the first DC voltage is equal to the second DC voltage.

19. A charging apparatus for a vehicle, the apparatus comprising:
    a power converter including:
       a primary stage configured to receive an incoming voltage to generate a first input voltage;
       a first secondary stage including a first plurality of electrical components configured to generate a first portion of an output voltage to charge at least one battery in a vehicle based on the first input voltage;
       a second secondary stage in series with the first secondary stage including a second plurality of electrical components configured to generate a second portion of the output voltage to charge the at least one battery based on the first input voltage; and
       a transformer operatively coupled to the primary stage, the first secondary stage, and the second secondary stage to transfer the first input voltage to the first secondary stage and the second secondary stage, wherein each of the first plurality of electrical components and the second plurality of electrical components is rated to a voltage rating that is less than a total sum of the first portion and the second portion of the output voltage.

20. The apparatus of claim 19, wherein the power converter is a DC/DC converter.

\* \* \* \* \*